US009133719B2

(12) United States Patent
Witz et al.

(10) Patent No.: US 9,133,719 B2

(45) Date of Patent: Sep. 15, 2015

(54) THERMAL BARRIER COATING SYSTEM, COMPONENTS COATED THEREWITH AND METHOD FOR APPLYING A THERMAL BARRIER COATING SYSTEM TO COMPONENTS

(75) Inventors: Gregoire Witz, Birmenstorf (CH); Markus Schaudinn, Baden (CH); Hans-Peter Bossmann, Lauchringen (DE); Matthieu Esquerre, Neuenhof (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 0 days.

(21) Appl. No.: 13/160,556

(22) Filed: Jun. 15, 2011

(65) Prior Publication Data

US 2011/0300357 A1 Dec. 8, 2011

Related U.S. Application Data

(63) Continuation of application No. PCT/EP2009/067065, filed on Dec. 14, 2009.

(30) Foreign Application Priority Data

Dec. 15, 2008 (EP) .................................... 08171598

(51) Int. Cl.

*B32B 7/02* (2006.01)
*B32B 5/14* (2006.01)

(Continued)

(52) U.S. Cl.

CPC . *F01D 5/288* (2013.01); *C23C 4/02* (2013.01); *C23C 4/105* (2013.01); *C23C 28/321* (2013.01);

(Continued)

(58) Field of Classification Search

USPC ............ 428/213, 689, 469, 319.1, 336, 310.5

See application file for complete search history.

(56) References Cited

U.S. PATENT DOCUMENTS 4,328,285 A 5/1982 Siemers et al.
4,335,190 A 6/1982 Bill et al.

(Continued)

FOREIGN PATENT DOCUMENTS

CN 86 1 02486 A 10/1986
CN 101198713 A 6/2008

(Continued)

OTHER PUBLICATIONS

European Patent Office, European Search Report in European Patent Application No. 08171598.0 (Mar. 18, 2009).

(Continued)

*Primary Examiner* — Tahseen N Khan

(74) *Attorney, Agent, or Firm* — Buchanan Ingersoll & Rooney PC

(57) ABSTRACT

A thermal barrier coating system on a base material includes a bond coat layer with a lower face in direct contact with the base material and an upper face, a first ceramic layer in direct contact with the upper face of the bond coating layer and a second ceramic layer disposed on an outermost surface of the coating system and configured to be exposed to hot gas. The first ceramic layer includes a layer, combination, mixture, alloy, blend or multilayer structure of at least one of yttria-stabilized zirconia with a yttria content in a range of 6-8 wt-%, YTaO4 doped zirconia, and titania doped zirconia. The second ceramic layer includes a layer, combination, mixture, alloy, blend or multilayer structure of at least one of YTaO4 doped zirconia, titania doped zirconia, scandia stabilized zirconia, ceria containing perovskite material, yttrium aluminum garnet material, Monazite material, and spinel material. A material of the second ceramic layer is different from a material of the first ceramic layer.

19 Claims, 1 Drawing Sheet

(51) Int. Cl.

| | |
|---|---|
| ***B32B 3/26*** | (2006.01) |
| ***B32B 3/00*** | (2006.01) |
| ***B32B 19/00*** | (2006.01) |
| ***B32B 15/04*** | (2006.01) |
| ***F01D 5/28*** | (2006.01) |
| ***C23C 4/02*** | (2006.01) |
| ***C23C 4/10*** | (2006.01) |
| ***C23C 30/00*** | (2006.01) |
| ***C23C 28/00*** | (2006.01) |

(52) U.S. Cl.

CPC ........... *C23C 28/3215* (2013.01); *C23C 28/345* (2013.01); *C23C 28/3455* (2013.01); *C23C 28/36* (2013.01); *C23C 30/00* (2013.01); *F05D 2300/2118* (2013.01); *Y10T 428/2495* (2015.01); *Y10T 428/24999* (2015.04); *Y10T 428/249961* (2015.04); *Y10T 428/265* (2015.01)

(56) References Cited

U.S. PATENT DOCUMENTS

| | | | | |
|---|---|---|---|---|
| 4,451,299 | A | 5/1984 | Smeggil et al. | |
| 4,485,151 | A | 11/1984 | Stecura | |
| 4,913,961 | A | 4/1990 | Jones et al. | |
| 5,008,221 | A | 4/1991 | Ketcham | |
| 5,840,434 | A | 11/1998 | Kojima et al. | |
| 6,221,181 | B1 | 4/2001 | Bossmann et al. | |
| 6,306,517 | B1 * | 10/2001 | Gray et al. | 428/469 |
| 6,812,176 | B1 | 11/2004 | Zhu et al. | |
| 6,863,999 | B1 | 3/2005 | Sudre et al. | |
| 6,887,595 | B1 | 5/2005 | Darolia et al. | |
| 6,890,668 | B2 | 5/2005 | Bruce et al. | |
| 6,930,066 | B2 | 8/2005 | Subramanian | |
| 7,186,466 | B2 | 3/2007 | Zhu et al. | |
| 8,047,775 | B2 | 11/2011 | Barnikel et al. | |
| 2002/0164430 | A1 | 11/2002 | Heimberg et al. | |
| 2003/0035945 | A1 | 2/2003 | Strangman et al. | |
| 2003/0138659 | A1 | 7/2003 | Shanker | |
| 2005/0036891 | A1 | 2/2005 | Spitsberg et al. | |
| 2005/0142392 | A1 | 6/2005 | Spitsberg et al. | |
| 2005/0142393 | A1 | 6/2005 | Boutwell et al. | |
| 2005/0238894 | A1 | 10/2005 | Gorman et al. | |
| 2006/0040127 | A1 | 2/2006 | Spitsberg et al. | |
| 2006/0078750 | A1 * | 4/2006 | Zhu et al. | 428/469 |
| 2006/0099358 | A1 * | 5/2006 | Raybould et al. | 428/34.1 |
| 2007/0160859 | A1 | 7/2007 | Darolia et al. | |
| 2008/0057326 | A1 * | 3/2008 | Schlichting et al. | 428/472 |
| 2008/0261073 | A1 * | 10/2008 | Maloney et al. | 428/680 |
| 2009/0176059 | A1 | 7/2009 | Namba et al. | |
| 2010/0136241 | A1 | 6/2010 | Schlichting et al. | |

FOREIGN PATENT DOCUMENTS

| | | | |
|---|---|---|---|
| EP | 0605196 | A1 | 7/1994 |
| EP | 1507022 | A1 | 2/2005 |
| EP | 1514953 | A2 | 3/2005 |
| EP | 1550642 | A2 | 7/2005 |
| EP | 1550645 | A2 | 7/2005 |
| EP | 1588992 | A1 | 10/2005 |
| EP | 1627862 | A2 | 2/2006 |
| EP | 1806435 | A2 | 7/2007 |
| EP | 1900848 | A2 | 3/2008 |
| JP | 63274751 | A | 11/1988 |
| JP | 2007-270245 | A | 10/2007 |
| JP | 2008-248393 | A | 10/2008 |
| WO | WO 0183851 | A1 | 11/2001 |

OTHER PUBLICATIONS

Office Action/Search Report issued on Apr. 4, 2014, by the Chinese Patent Office in corresponding Chinese Patent Application No. 200980151590.5 and an English translation of the Office Action/ Search Report. (21 pages).

An English Translation of the Office Action (Notification of Reasons for Refusal) issued on Nov. 25, 2013, by the Japanese Patent Office in corresponding Japanese Patent Application No. 2011-541375. (3 pages).

* cited by examiner

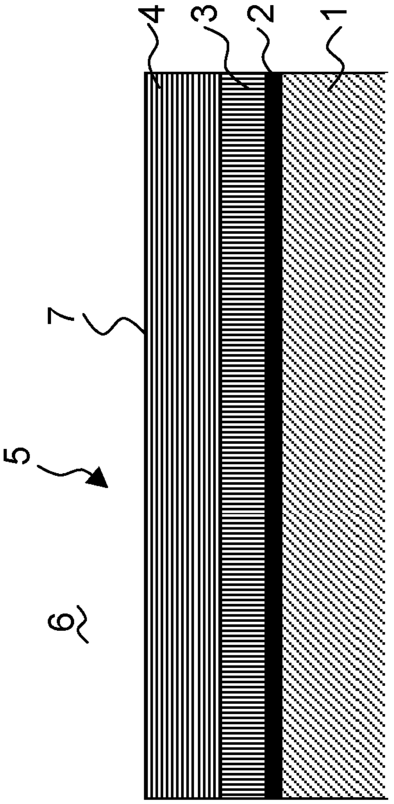
a)
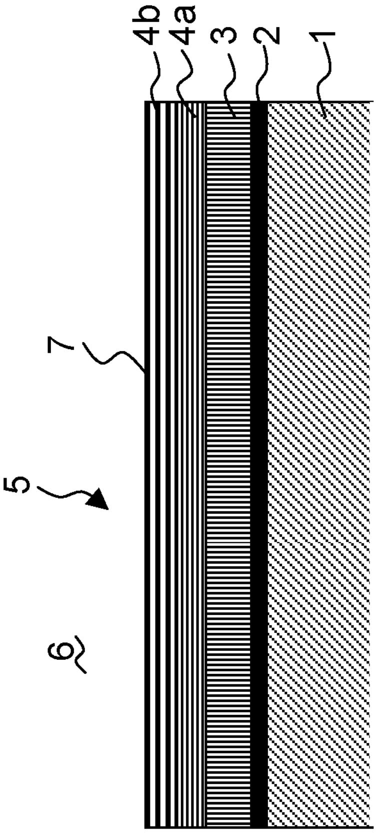
b)

THERMAL BARRIER COATING SYSTEM, COMPONENTS COATED THEREWITH AND METHOD FOR APPLYING A THERMAL BARRIER COATING SYSTEM TO COMPONENTS

CROSS REFERENCE TO RELATED APPLICATIONS

This application claims priority to International Patent Application No. PCT/EP2009/067065, filed Dec. 14, 2009, which claims priority to European Patent Application No. 08 171 598.9, filed Dec. 15, 2008, both of which are incorporated by reference herein in their entireties.

FIELD

The present invention relates to the field of thermal barrier coating (TBC) systems, in particular to multilayer YSZ-based coating systems, components coated therewith and to methods for applying such a thermal barrier coating system to components.

BACKGROUND

Up to now, TBC systems rely on a ceramic layer of yttria-stabilized zirconia deposited either by thermal spray (for instance atmospheric plasma spray) or by a vapor deposition method (like physical vapor deposition); deposited on a MCrAlY or a PtAl bondcoat which is deposited on the base material.

Up to now, the first choice TBC material is the 6-8 wt % yttria stabilized zirconia (YSZ) composition described in U.S. Pat. No. 4,485,151. TBC prepared with 6-8 wt % yttria stabilized zirconia are after the coating process composed in the majority of a metastable tetragonal phase, which decomposes during exposure at high temperature. This decomposition process can lead to the destabilization and delamination of the TBC system.

During the past twenty years, numerous attempts have been performed at improving (TBC) systems.

Two main objectives have been targeted:

- Reduce the thermal conductivity of the TBC materials, such to allow a reduction of the cooling needs
- Increase the high temperature stability of the TBC materials, such to allow operating coated parts at higher surface temperature.

Both of these objectives are linked to a reduction of the cooling needs, which will be correlated with an increase of gas turbine efficiency.

During the first studies on improved TBC materials, the focus was on using zirconia-based materials and optimizing their doping such to obtain either an improved high temperature stability of the material or a reduced thermal conductivity.

In the context of the present invention of the following documents seem noteworthy:

U.S. Pat. No. 4,335,190 describes a multilayer system made of yttria stabilized zirconia with an inner layer which is around 1.5 pm thick. U.S. Pat. No. 5,840,434 discloses a multilayer zirconia coating with an outer layer having a columnar structure. EP 0 605 196 discloses a multilayer zirconia coating with 0% porosity in the inner layer and 10-20 & porosity in the outer layer. U.S. Pat. No. 6,930,066 discloses a single layer zirconia coating stabilized with more than 30 wt % $Y_2O_3$.

EP1 514 953 describes a multilayer zirconia coating with an outer layer consisting of cubic YSZ. U.S. Pat. No. 6,887,595 discloses a multilayer system with an outer layer consisting of cubic zirconia stabilized with 1) Yb, Nd, Yb+La, Nd+La (5 to 49 mol %); 2) Y, Ca, Ce, Sc, Mg, In, (<4 mole %); 3) Hf (0.5 to 40 mole %) or Ta (0.5 to 10 mole %).

U.S. Pat. No. 4,328,285 describes a single layer coating made of ceria stabilized zirconia. WO01/83851 describes a multilayer system resistant to environmental contaminants, with an outer layer composed of ceria-stabilized zirconia, and the outer layer being significantly thinner than the inner layer.

U.S. Pat. No. 6,812,176 and U.S. Pat. No. 7,186,466 describe a single layer coating made of zirconia stabilized with multiple cluster forming doping elements, the doping elements are for the majority rare-earths. EP 1 550 642 discloses a single layer coating made of YSZ (>91 mol %)+1) Y, Ca, Ce, Sc, Mg, or In+2) La, Gd, Nd, Sm, or Dy+3) Yb or Er.

EP 1 550 645 describes a single layer coating made of YSZ doped with La and Nd or doped with La and Yb. EP 1 627 862 describes a coating made of Lanthana doped zirconia stabilized with one element from the group of Y, Gd, Ca, Ce, Mg, Sc, In. U.S. Pat. No. 6,890,668 describes a single layer coating made of (Er, Nd, Sm)—SZ having a cubic fluorite structure. EP 1 588 992 describes a multilayer coating made of Hf—SZ doped with Y, Ca, Ce, Sc, Mg, In, La, Gd, Nd, Dy, Er, Yb, Eu or Pr.

U.S. Pat. No. 4,913,961 describes a single layer coating made of Sc—SZ.

U.S. Pat. No. 4,335,190 describes a multilayer system made of calcia-stabilized zirconia with an inner layer around 1.5 pm thick.

WO0183851 (priority date 27 Apr. 2000) describes a multilayer system resistant to environmental contaminants, with an outer layer composed of calcia-stabilized zirconia, and the outer layer being significantly thinner than the inner layer.

EP 1 507 022 describes a single layer coating made of YSZ doped with a pentavalent oxide which can be Ta (1-4 mol %).

US2002164430 describes a single layer coating made of $CaZrO_3$ where Ca is partially substituted with another element like Sr.

EP 1 900 848 describes a multilayer coating with an outer layer made of a material having a garnet structure, the coating will reduce sand related distress.

U.S. Pat. No. 6,863,999 describes a single layer coating of a rare-earth element phosphate (xenotime or monazite).

JP63274751 describes a multilayer coating with an outer and inner layer system made of stabilized zirconia and the middle layer is composed of a spinel.

US 2006/0078750 describes layer structures, in which, on a component, a first bond coat layer is applied and then a first ceramic layer consisting of 7YSZ. On this first ceramic layer there is provided a second ceramic layer. Among different possibilities, for the second ceramic layer multiple rare earth doped yttria stabilized zirconia is proposed. Analogous structures are disclosed in U.S. Pat. No. 6,887,595 as well as in EP 1806435.

SUMMARY OF THE INVENTION

An aspect of the present invention is to provide an improved thermal barrier coating system in particular for components which are exposed to hot corrosive gas flows, such as for example in the flow part of gas turbines, compressors and the like. Furthermore another aspect of the present invention is to provide a method for producing such a thermal barrier coating system and to provide components coated at least in regions with such a thermal barrier coating system.

In an embodiment, the present invention provides a thermal barrier coating system on a base material including a bond coat layer with a lower face in direct contact with the base material and an upper face, a first ceramic layer in direct contact with the upper face of the bond coating layer and a second ceramic layer disposed on an outermost surface of the coating system and configured to be exposed to hot gas. The first ceramic layer includes a layer, combination, mixture, alloy, blend or multilayer structure of at least one of yttria-stabilized zirconia with a yttria content in a range of 6-8 wt-%, YTaO4 doped zirconia, and titania doped zirconia. The second ceramic layer includes a layer, combination, mixture, alloy, blend or multilayer structure of at least one of YTaO4 doped zirconia, titania doped zirconia, scandia stabilized zirconia, ceria containing perovskite material, yttrium aluminium garnet material, Monazite material, and spinel material. A material of the second ceramic layer is different from a material of the first ceramic layer.

BRIEF DESCRIPTION OF THE DRAWINGS

Preferred embodiments of the invention are described in the following with reference to the drawings, in which:

FIG. 1*a* is a schematic cut perpendicular to the surface plane of a component with a thermal barrier coating system with two ceramic layers; and FIG. 1*b* is a schematic cut perpendicular to the surface plane of a component with a thermal barrier coating system with three ceramic layers.

DETAILED DESCRIPTION

In an embodiment of the invention, a thermal barrier coating system on a base material includes a bond coat layer on its lower face in direct contact with said base material and on its upper face in direct contact with a first ceramic layer, and comprising a second ceramic layer on the outermost, hot gas exposed surface of the coating system. In other words on the base material, typically metal (including alloys), there is first a bond coat layer, followed by and in direct contact with the first ceramic layer, and then either directly follows the second ceramic layer forming the outermost hot gas exposed surface of the coating system or between this second ceramic layer and the first ceramic layer there is further intermediate layers. It should be noted that the second ceramic layer may also be over coated by some kind of impregnation or thin protective layer on its hot gas exposed surface. It should furthermore be noted that the first ceramic layer as well as the second ceramic layer may also be multilayer structures in which different materials or the same material is used. The expression "different materials" shall include materials with the same constituents (atoms) but in different proportions or different phases. Typically the first ceramic layer and the second ceramic layer are made of different materials.

According to embodiments of the invention, the first ceramic layer consists of yttria-stabilised zirconia ($ZrO_2$) with a yttria content in the range of 6-8 wt-% (6 w/o to 8 w/o $Y_2O_2$).

Specifically, the yttria-stabilised zirconia ($ZrO_2$) with a yttria content in the range of 6-8 wt-% can be provided as described in U.S. Pat. No. 4,485,151, and as concerns this possible material choice for the first ceramic layer, the disclosure of U.S. Pat. No. 4,485,151 is specifically incorporated by reference herein.

In the alternative the first ceramic layer consists of $YTaO_4$ doped zirconia or of titania doped zirconia. It is also possible that the first ceramic layer consists of a combination (mixture and/or layers) of these differing materials. Preferably in case of $YTaO_4$ doped zirconia $ZrO_2$ is doped with 15-22 mol % $YTaO_4$.

According to the invention the material of the second ceramic layer furthermore is selected from one or several of the following materials:

$YTaO_4$ doped zirconia, titania doped zirconia, scandia stabilised zirconia, multiple rare-earth doped yttria stabilised zirconia, ceria stabilised zirconia, ceria containing perovskite material, yttrium aluminium garnet material, Monazite material (typically of the general structure $RE(PO_4)$ with RE=Ce, La, Nd, Pr, Y, may further comprise up to 20% Th), spinel material, and combinations, mixtures, alloys, blends or multilayer structures thereof.

The above definition of the materials for the first ceramic layer and the second ceramic layer is to be understood with the proviso that if the first ceramic layer consists of $YTaO_4$ doped zirconia and/or titania doped zirconia, the material of the second ceramic layer is not selected from $YTaO_4$ doped zirconia and/or titania doped zirconia. In other words the material for the first ceramic layer and for the second ceramic layer needs to be different in any case.

Up to now no TBC system did provide a significant improvement over the state of the art. One of the reasons of this lack of success has been proposed to reside in the combined effect of some YSZ properties:

1) Tetragonal zirconia exhibit a ferroelastic behavior that provide a toughening mechanism to the material;
2) Tetragonal zirconia can transform in monoclinic zirconia at low temperature and in cubic zirconia at high temperature. Any of these phase transformations lead to a destabilization of the TBC and its failure. For this reason, tetragonal zirconia can be used in TBC only if it is the so-called non-transformable tetragonal region of the phase diagram, ranging from 6 wt % Y203 doped $ZrO_2$ to around 12 wt % $Y_2O_3$ doped $ZrO_2$. The toughening mechanism is considered to be important at the bondcoat-TBC interface, where the thermal stresses are the highest and usually the TBC failure occurs by cracking. The toughening mechanism provides a mechanism to slow down the crack propagation. At the outer surface of the TBC, the high temperature stability of the YSZ is critical for the TBC lifetime, since the temperatures that are experienced by the TBC induce a significant decomposition of the YSZ. The decomposition of the TBC forms a low yttria content phase which can transform from tetragonal to monoclinic upon cooling, and back to tetragonal upon heating. This phase transformation is accompanied by a volume change, which induces additional stresses in the TBC and can lead to its failure.

In the case of a multilayer TBC, the situation is different since one can use a material having good mechanical properties at the interface with the bondcoat and another material having high temperature stability for the outermost layer.

Thus, embodiments of the invention provide a multilayer TBC system having a metal as base material (preferentially a Ni based superalloy), a bondcoat (preferentially a MCrAlY), a first ceramic layer of yttria-stabilized zirconia with 6-8 wt % of yttria or another material having a good toughening mechanism, and a second ceramic layer made of a material having an increased high temperature stability when compared to yttria stabilized zirconia with 6-8 wt % of yttria. As discussed above, the yttria-stabilized zirconia with 6-8 wt % of yttria layer allows to provide a toughening mechanism at the bondcoat-TBC interface, and the outer layer will reduce the current problems of the yttria-stabilized zirconia with 6-8 wt % of yttria decomposition at high temperature forming undesirable low yttria content tetragonal phase that will transform into a monoclinic phase upon cooling. Additionally the new TBC material can have a reduced sintering rate at high temperature. The TBC sintering leads to an increase of TBC stiffness, leading to an increased stress level in the TBC system and an increased the risk of TBC failure.

As mentioned above, the first ceramic layer preferably consists of $YTaO_4$ doped zirconia or of titania doped zirconia or of a combination (mixture and/or layers) of these differing materials. In this case the second ceramic layer can be selected from one or several of the following materials: $YTaO_4$ doped zirconia, titania doped zirconia, scandia stabilised zirconia, multiple rare-earth doped yttria stabilised zirconia, ceria stabilised zirconia, ceria containing perovskite material, yttrium aluminium garnet material, Monazite material (typically of the general structure RE($PO_4$) with RE=Ce, La, Nd, Pr, Y, may further comprise up to 20% Th), spinel material, and combinations, mixtures, alloys, blends or multilayer structures thereof, again with the proviso that if the first ceramic layer consists of $YTaO_4$ doped zirconia and/or titania doped zirconia, the material of the second ceramic layer is not selected from $YTaO_4$ doped zirconia and/or titania doped zirconia. In other words the material for the first ceramic layer and for the second ceramic layer needs to be different in any case.

If the first ceramic layer consists of yttria-stabilised zirconia ($ZrO_2$) with a yttria content in the range of 6-8 wt-% (6 w/o to 8 w/o $Y_2O_2$), preferably the second ceramic layer is selected from one or several of the following materials: $YTaO_4$ doped zirconia, titania doped zirconia, scandia stabilised zirconia, ceria containing perovskite material, yttrium aluminium garnet material, Monazite material (typically of the general structure RE($PO_4$) with RE=Ce, La, Nd, Pr, Y, may further comprise up to 20% Th), spinel material, and combinations, mixtures, alloys, blends or multilayer structures thereof, again with the proviso that if the first ceramic layer consists of $YTaO_4$ doped zirconia and/or titania doped zirconia, the material of the second ceramic layer is not selected from $YTaO_4$ doped zirconia and/or titania doped zirconia. In other words the material for the first ceramic layer and for the second ceramic layer needs to be different in any case. So preferably in this case the second ceramic layer does not comprise multiple rare-earth doped yttria stabilised zirconia, or ceria stabilised zirconia. In this respect it is specifically noted that the above-mentioned documents of the state-of-the-art, notably US 2006/0078750, U.S. Pat. No. 6,887, 595 as well as in EP 1806435 all only expressly disclose layer structures, in which, on a component, a first bond coat layer is applied and then a first ceramic layer consisting of 7YSZ, and on this specific first ceramic layer there is provided a second ceramic layer based on multiple rare earth doped yttria stabilized zirconia.

In a further preferred embodiment of the present invention, the base material is a metal, preferably a superalloy, more preferably a Ni-based superalloy. Generally, typical base materials as used in the hot gas path of gas turbines can form the base material for the thermal barrier coating system according to the invention.

According to a further preferred embodiment of the present invention, the bond coat layer comprises all preferably consists of a CrAl base material. Preferably it comprises or consists of MCrAlRX base material, wherein M is selected from Fe, Co, Ni or Co/Ni, R is selected from Y or Yb, and wherein X is optional and can for example be selected from Pt, Hf, Si, Zr, Ta, Re, and Ru and combinations thereof.

As mentioned above, according to a further preferred embodiment the second ceramic layer with its lower face directly contacts the (upper face of the) first ceramic layer, meaning that the first and the second ceramic layer are in direct contact with each other and there is no intermediate layers. For sufficient mechanical strength of the multilayer structure it is preferred that the interface between the two layers (first and second ceramic layer) is either graded or provided by a rough interface providing mechanical adhesion between the two layers.

The first as well as the second ceramic layer can be layer structures composed of several ceramic layers of course under the condition that the materials are selected as given above. According to a further preferred embodiment however, the first as well as the second ceramic layer are single layers. The expression single layer shall mean that the whole layer is made of one same material (same phase, same composition/proportion of constituents). It is however not necessarily implied that the single layer is produced in a single deposition process, such a single layer may also be produced in a succession of deposition steps in which the same material is deposited in each step.

According to a further preferred embodiment, in particular the second ceramic layer can be composed of at least two ceramic layers of different composition and/or microstructure and/or phase composition.

If for the first or the second ceramic layer $YTaO_4$ doped zirconia is used, preferably the zirconia is doped with 14-17 mol-% of $YTaO_4$.

If for the first or the second ceramic layer titania doped zirconia is used, the zirconia is preferably doped with 4-14 mol-% of $TiO_2$.

If for the second ceramic layer multiple rare-earth doped yttria stabilised zirconia is used, preferably the yttria doping is given by combinations of Nd/Yb, Gd/Yb, and/or Sm/Yb.

If for the second ceramic layer ceria stabilised zirconia is used, preferably the zirconia is doped with 20-30 mol-% of $CeO_2$.

If for the second ceramic layer ceria containing perovskite material is used, preferably this is selected from $BaCeO_3$ and/or $SrCeO_3$.

If for the second ceramic layer Monazite is used, preferably the Monazite this is selected as $LaPO_4$, optionally comprising Th.

If for the second ceramic layer a spinel is used, preferably this is selected from BaY2O4 and/or $SrY_2O_4$.

According to yet another preferred embodiment of the invention, the first ceramic layer has a porosity as measured according to mercury porosimetry or by image analysis in the range of 10-40%, preferably in the range of 15-30%.

It is furthermore preferred that the first ceramic layer has a thickness in the range of 50-1000 μm, preferably in the range of 100-500 μm.

As concerns the second ceramic layer(s), it is preferred that it/they has/have a porosity in the range of 5-80%, preferably in the range of 5-25%.

The second ceramic layer(s) preferably has a graded porosity with a porosity in the range of 20-80%, preferably in the range of 20-25%, at the interface with the first ceramic layer and reducing to a porosity in the range of 5-20%, preferably in the range of 5-10% of the interface with the hot gas.

According to a further preferred embodiment, the second ceramic layer(s) has a thickness in the range of 300-2000 μm.

Furthermore it is generally preferred if the thickness of the first ceramic layer is smaller than the thickness of the second ceramic layer in case of a single second ceramic layer, and is smaller than the total thickness of the multitude of second ceramic layers in case of a multitude of second ceramic layers.

Furthermore the present invention relates to a method for making a thermal barrier coating system as described above.

Preferably the method includes a first step (optionally after preceding surface preparation of the base material of metal such as grinding and/or cleaning and/or chemical treatment) in which a bond coat layer is applied to a component of metal base material. The bond coat layer is preferably applied by using thermal spray and/or electron beam physical vapour deposition. Subsequently in a second step the first ceramic layer is applied directly onto the bond coat layer in one or several steps. Preferably this ceramic layer is applied using a method selected from: electrophoretic deposition, plasma spray, electron beam physical vapour deposition, powder coating, vacuum powder spray deposition, chemical deposition, laser assisted deposition, ion beam assisted deposition. Now either intermediate ceramic layers can be applied and then the second ceramic layer applied, or, as preferred, the second ceramic layer is directly applied onto the first ceramic layer. Correspondingly in a third step the second ceramic layer or the several second ceramic layers are applied onto the first ceramic layer in one or several steps, optionally followed by the application of protective layer or protective impregnation of the surface. The methods for applying this second ceramic layer are preferably selected from one of the methods indicated above for the application of the first ceramic layer.

Furthermore the present invention relates to a component, in particular hot gas exposed components of a gas turbine, comprising a coating system as described above, preferably produced using a method as described above.

An embodiment of the present invention includes a multi-layer TBC system having a metal base material 1, a bondcoat 2, a first ceramic layer 3 of yttria-stabilized zirconia with 6-8 wt % of yttria, and a second ceramic layer 4 made of any of the following materials:

- $YTaO_4$ doped zirconia (preferentially with 14-17 mol % $YTaO_4$);
- Titania doped zirconia (preferentially with 4-14 mol % $TiO_2$);
- Scandia stabilized zirconia;
- A multiple rare-earth doped yttria stabilized zirconia (combinations of Nd & Yb, or Gd & Yb, or Sm & Yb);
- Ceria stabilized zirconia (preferentially with 20 to 30 mol % of $CeO_2$);
- A Ce containing perovskite material (preferentially $BaCeO_3$ or $SrCeO_3$);
- A yttrium aluminum garnet (YAG);
- Monazite ($LaPO_4$);
- A spinel (like $BaY_2O_4$ or $SrY_2O_4$).

Another possibility is to use a multilayer system as described above, but to change the composition of first ceramic layer using either titania doped zirconia, or $YTaO_4$ doped zirconia. Both of these compositions are expected to improve the toughness to the $1^{st}$ ceramic layer 3. In this case the first ceramic layer 3 and the second ceramic layer 4 should not be composed of the same material.

As illustrated in FIG. 1*b*, in particular the second ceramic layer 4 may comprise several layers of different material, indicated in the figure as 4*a* and 4*b*. These layers may have the same or different thickness. What is important is that the second ceramic layer 4 or the topmost of the second ceramic layers 4*b* is forming the surface 7 which is exposed to the hot gas flow 6. This however does not exclude that a thin surfacial layer can be present on the second ceramic layer, and also there may be impregnations on this top ceramic layer.

The interface between the first and second ceramic layers can be either graded (mixture of both materials with a composition gradient along the interface), or a rough interface providing also a mechanical adhesion between the two ceramic layers.

The first ceramic layer normally has a porosity level of 10-40% (preferentially from 15-30%) and a thickness of 50 to 1000 microns (preferentially from 100 to 500 microns).

The second ceramic layer can be composed of one or more ceramic layers of different microstructure or phase composition.

The second ceramic layer has a porosity level of 5-80% (preferentially 5-25%) and a thickness of 300 to 2000 microns.

The porosity level of the second ceramic layer can be graded starting from 20-80% (preferentially from 20-25%) at the interface with the 1" ceramic layer and reducing to 5-10% at the interface with the hot gas.

The bondcoat can be processed either by plasma spray or EB-PVD, and can be in some embodiment defined to have a specific composition.

In an experimental trial a prototype was produced by coating a base material 1 (specifically a component of a gas turbine) with a bond coat layer (composition by weight, see also U.S. Pat. No. 6,221,181: 28-35% Co, 11-15% Cr, 10-13% Al, 0-1% Re, 1-2% Si, 0.2-1% Ta, 0.005-0.5% Y, 0-5% Ru, 0-1% Ca, 0-1% Mg, 0-0.5% La (or elements from the La series), 0-0.1% B, balance Ni and incidental impurities) using plasma spray deposition. The resulting thickness of the bond coat layer was in the range of 300-400 μm.

Subsequently a first ceramic layer of YSZ with the above specified yttria content was applied using thermal spray deposition leading to a layer thickness in the range of 300-500 μm and a first ceramic layer with a porosity of approximately 20-25%.

After that second ceramic layer was deposited onto the rough top surface of the first ceramic layer using thermal spray deposition, wherein as a material $YTaO_4$ doped zirconia (14% doping in $YTaO_4$) was used. The resulting second ceramic layer had a layer thickness in the range of 600-800 μm and the second ceramic layer has a porosity of approximately 20-25%.

Further experimental data for $YTaO_4$ in the first layer ($YTaO_4$ doped zirconia):

Samples were prepared by mixing $ZrO_2$ with 20 mol % of $YTaO_4$, after annealing at 1500° C. for 600° C. The samples were investigated by means of X-Ray diffraction at room temperature, and no decomposition of the tetragonal $YtaO_4$—$ZrO_2$ phase is observed and no monoclinic $ZrO_2$ is observed (no dissociation of $ZrO_2$ and $YtaO_4$).

By contrast, in 7 wt % $Y_2O_3$ stabilized $ZrO_2$ (/YSZ) samples, at such temperatures and annealing times the tetragonal phase is fully decomposed into cubic and monoclinic zirconia.

This is in agreement with data showing that with increasing $YTaO_4$ the transition temperature from tetragonal to monoclinic zirconia is reduced, allowing to retain a tetragonal zirconia structure down to room temperature.

Therefore $ZrO_2$ stabilized with 15-22 mol % $YtaO_4$ is an attractive TBC material, more specially at the interface between the bondcoat and the TBC, because of its:

1) long term stability at elevated temperature
2) absence of phase transformation upon heating and cooling
3) low thermal conductivity
4) high fracture toughness due to the ferroelastic behavior of the tetragonal zirconia phase It has to be mentioned that in the Y—Ta—Zr—O system, there is normally only a small portion of the system (from $ZrO_2$ doped with 15 mol % $YTaO_4$ to $ZrO_2$ doped with 22 mol % $YTaO_4$) that is exhibiting the combination of this properties.

The resulting thermal barrier coating structure showed an increased resistance to spallation, delamination as well as destabilisation and showed ideal improved thermal conductivity values.

While the invention has been particularly shown and described with reference to preferred embodiments thereof, it will be understood by those skilled in the art that various changes in form and details may be made therein without departing from the spirit and scope of the invention.

LIST OF REFERENCE SIGNS

1 base material, component
2 bond coat layer
3 first ceramic layer
4 second ceramic layer
4*a* lower second ceramic layer
4*b* surface second ceramic layer
5 thermal barrier coating system
6 area of hot gas flow
7 surface of 1

What is claimed is:

1. A thermal barrier coating system on a base material, the system comprising:

a bond coat layer having a lower face in direct contact with the base material and an upper face;

a first ceramic layer in direct contact with the upper face of the bond coating layer, the first ceramic layer consisting of:

$YTaO_4$ doped zirconia, consisting of $YTaO_4$ and zirconia, wherein the $YTaO_4$ doped zirconia is zirconia doped with 15-22 mol-% $YTaO_4$; and a second ceramic layer disposed at an outermost hot gas exposed surface of the coating system, the second ceramic layer including at least one material selected from the group consisting of:

scandia stabilized zirconia, consisting of scandia and zirconia, ceria containing perovskite material, Monazite material, and spinel material.

2. The thermal barrier coating system recited in claim 1, wherein the second ceramic layer includes one of a layer, combination, mixture, alloy, blend and multilayer structure.

3. The thermal barrier coating system recited in claim 1, wherein the bond coat layer includes at least one of a PtAl base material and a MCrAlRX base material, wherein M is selected from the group consisting of Fe, Co, Ni and Co/Ni, R is selected the group consisting of Y and Yb, and X is absent or includes at least one of Pt, Hf, Si, Zr, Ta, Re and Ru.

4. The thermal barrier coating system recited in claim 1, wherein a lower face of the second ceramic layer directly contacts the first ceramic layer at an interface, and wherein the interface is at least one of graded and rough so as to provide mechanical adhesion between the first and second ceramic layers.

5. The thermal barrier coating system recited in claim 1, wherein the first and second layers are single layers.

6. The thermal barrier coating system recited in claim 1, wherein the second ceramic layer includes at least two ceramic sub-layers differing in at least one of composition, microstructure and phase composition.

7. The thermal barrier coating system recited in claim 1, wherein the second ceramic layer has a graded porosity, including a porosity in a range of 20-80% at an interface with the first ceramic layer and a porosity in a range of 5-10% at the outermost surface.

8. The thermal barrier coating system recited in claim 1, wherein the second ceramic layer has a thickness in a range of 300-2000 μm.

9. The thermal barrier coating system recited in claim 1, wherein a thickness of the first ceramic layer is smaller than a thickness of the second ceramic layer.

10. The thermal barrier coating system recited in claim 1, wherein the base material is a metal superalloy.

11. The thermal barrier coating system recited in claim 10, wherein the superalloy is a Ni-based superalloy.

12. The thermal barrier coating system recited in claim 1, where the first ceramic layer has a porosity in a range of 10-40%.

13. The thermal barrier coating system recited in claim 12, wherein the first ceramic layer has a porosity in a range of 15-30%.

14. The thermal barrier coating system recited in claim 1, wherein the first ceramic layer has a thickness in a range of 50-1000 μm.

15. The thermal barrier coating system recited in claim 14, wherein the first ceramic layer has a thickness in a range of 100-500 μm.

16. A thermal barrier coating system on a base material, the system comprising:

a bond coat layer having a lower face in direct contact with the base material and an upper face;

a first ceramic layer in direct contact with the upper face of the bond coating layer, the first ceramic layer consisting of:

$YTaO_4$ doped zirconia, consisting of $YTaO_4$ and zirconia, wherein the $YTaO_4$ doped zirconia is zirconia doped with 14-17 mol-% $YTaO_4$;

a second ceramic layer disposed at an outermost hot gas exposed surface of the coating system, the second ceramic layer including at least one material selected from the group consisting of:

scandia stabilized zirconia, consisting of scandia and zirconia, ceria containing perovskite material, Monazite material, and spinel material.

17. The thermal barrier coating system recited in claim 16, the ceria containing perovskite material is selected from at least one of $BaCeO_3$ and $SrCeO_3$, the Monazite includes $LaPO_4$, and/or the spinel includes at least one of $BaY_2O_4$ and $SrY_2O_4$.

18. A thermal barrier coating system on a base material, the system comprising:

a bond coat layer having a lower face in direct contact with the base material and an upper face;

a first ceramic layer in direct contact with the upper face of the bond coating layer, the first ceramic layer consisting of $YTaO_4$ doped zirconia, wherein the $YTaO_4$ doped zirconia is zirconia doped with 15-22 mol-% $YTaO_4$; and a second ceramic layer disposed at an outermost hot gas exposed surface of the coating system, the second ceramic layer including at least one material selected from the group consisting of:

scandia stabilized zirconia, ceria containing perovskite material, yttrium aluminium garnet material, Monazite material, and
spinel material.

19. A thermal barrier coating system on a base material, the system comprising:

a bond coat layer having a lower face in direct contact with the base material and an upper face;

a first ceramic layer in direct contact with the upper face of the bond coating layer, the first ceramic layer consisting of $YTaO_4$ doped zirconia, wherein the $YTaO_4$ doped zirconia is zirconia doped with 14-17 mol-% of $YTaO_4$; and a second ceramic layer disposed at an outermost hot gas exposed surface of the coating system, the second ceramic layer including at least one material selected from the group consisting of:

scandia stabilized zirconia,
ceria containing perovskite material,
yttrium aluminium garnet material,
Monazite material, and
spinel material.

* * * * *